United States Patent [19]

Kuhlmann

[11] 4,237,854
[45] Dec. 9, 1980

[54] DAMPER CONSTRUCTION AND A METHOD OF COOLING A DAMPER

[75] Inventor: Herbert Kuhlmann, Bochum, Fed. Rep. of Germany

[73] Assignee: Sidepal S.A. Societe Industrielle de Participations Luxembourgeoise, Luxembourg, Luxembourg

[21] Appl. No.: 965,508

[22] Filed: Dec. 1, 1978

[30] Foreign Application Priority Data

Dec. 19, 1977 [LU] Luxembourg .............................. 78708

[51] Int. Cl.$^3$ .............................................. F23L 3/00
[52] U.S. Cl. ................................. 126/285 R; 110/163
[58] Field of Search ............................ 110/147, 163; 126/285 R

[56] References Cited

U.S. PATENT DOCUMENTS

| | | | |
|---|---|---|---|
| 1,542,989 | 6/1925 | Cohnery | 126/285 R |
| 2,391,010 | 12/1945 | Dalin | 126/285 R |
| 3,181,527 | 4/1965 | Forsman | 126/285 R |
| 3,245,401 | 4/1966 | Kast | 126/285 R |
| 4,164,211 | 8/1979 | Ohnem | 110/163 X |

*Primary Examiner*—Edward G. Favors
*Attorney, Agent, or Firm*—McGlew & Tuttle

[57] ABSTRACT

A damper construction, comprises, a central hollow tubular pipe pivot portion having an axially extending interior pipe coolant flow passage therethrough and a substantially cylindrical flat plate portion connected to the pipe pivot portion. The pipe pivot portion is mounted for rotation in a bearing formed at diametrically opposite sides of a tubular conduit made up of walls formed by longitudinal pipes arranged side-by-side in a circular pattern and welded together. The bearing includes a hollow portion and it is furnished with coolant which is circulated through the pipes of the conduit. The pipe pivot portion is rotatably supported on the bearing and, in addition to being cooled by the passage defined in the bearing, it includes a passage therethrough which connects into passages formed by a plurality of substantially concentrically arranged first and second arcuate bent tubes of different bend diameters which have respective ends connected to one side of the tubular pipe portion and the opposite side respectively.

7 Claims, 2 Drawing Figures

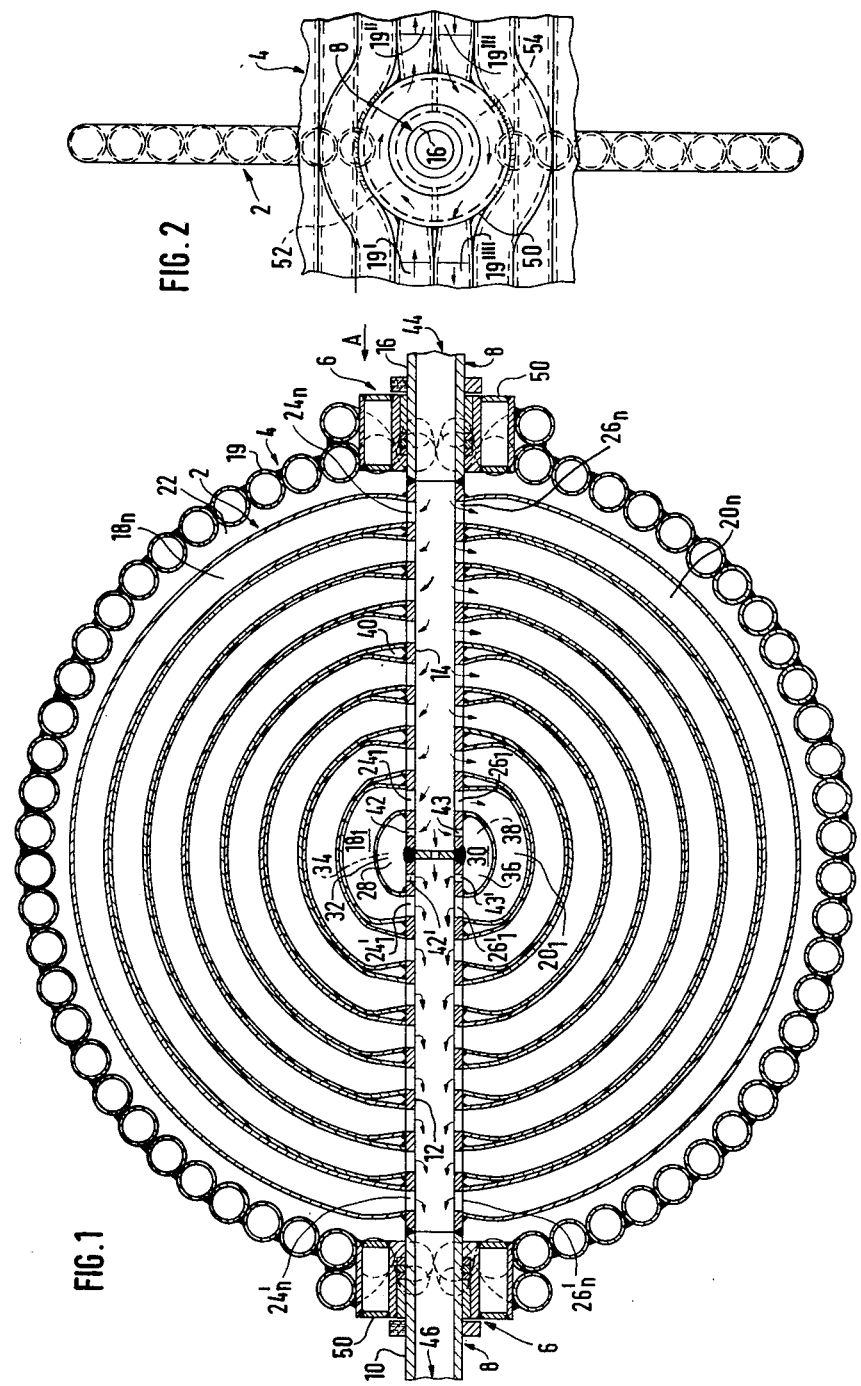

DAMPER CONSTRUCTION AND A METHOD OF COOLING A DAMPER

FIELD AND BACKGROUND OF THE INVENTION

This invention relates to damper controls in general and, in particular, to a new and useful cooled regulating damper for hot gas pipes and also to a likewise cooled mounting for this damper and to a method of cooling such damper.

DESCRIPTION OF THE PRIOR ART

Regulating dampers in hot gas pipes, for example, in waste gas pipes of industrial furnaces, particularly electric arc furnaces, serve to regulate the gas pressure and gas quantity in the pipes carrying gas and thus in those components of the overall installation which precede and follow the damper.

Regulating dampers of this kind and their mountings are exposed to extreme heat stresses and erosion and thus have an extremely short life, unless particular measures are taken, such as cooling and the use of special tools.

Since high stresses prevail, for example, in the waste gas pipes of electric arc furnaces for the production of special steels, water or steam-cooled dampers are therefore often used.

These cooled dampers of the prior art consist of a flat box-shaped cylinder, rotatably mounted on the gas pipe and supplied with a suitable coolant, such as water or hot steam, through its hollow pivot shaft. The discharge of the coolant is likewise effected through the hollow pivot shaft, e.g., on that side of the latter which is situated opposite the inlet for the coolant. This box-like damper contains guide bars for the coolant, providing it with what are considered to be more or less favorable flow paths.

This cooled regulating damper for hot gas pipes lasts longer than the uncooled type, but suffers from a number of serious drawbacks. For example, these known dampers do not enable certain zones of the damper to be supplied in a planned manner with greater quantities of coolant than other zones, in order to adapt the cooling effect to particular heat stress prevailing locally. The damper is thus subjected to uneven heat stress and thus has a shorter life.

Furthermore, for technical reasons connected with the manufacturing process, it is only certain points on their narrow sides that the aforementioned guide bars for the coolant are welded to the boundary walls of the damper, thus, leaving a more or less wide gap between the narrow sides of the bars and the walls of the damper, giving certain quantities of coolant a chance to escape and thus reducing the cooling efficiency and increasing the consumption of coolant.

A further disadvantage of these known dampers, in which the coolant is guided by the guide bars, resides in the presence of numerous blind angles, particularly, in the zones where the coolant is guided around free ends of the guide bars, making eddies and steam bubbles occur, with the attendant accumulation of heat and consequent pressure losses.

A further fundamental drawback of the known dampers is their flat box-like shape, which will not stand up to deformation from high coolant pressures, and this is a further factor which sets limits to the cooling efficiency which can be obtained thereby.

Finally, it has been found that the mounting system adopted for the shaft of the damper constitutes a critical point in this construction, since, if the gas in the hot gas pipes reaches a temperature of over 800° C., there is a serious danger that due to consequently inadequate cooling, the mounting will fail to perform its function.

SUMMARY OF THE INVENTION

The present invention substantially eliminates the aforementioned drawbacks and inadequacies of existing systems and comprises a regulating flap which will enable certain zones or areas thereof to be supplied in a planned manner with certain quantities of coolant and will also prevent the formation of eddies and steam bubbles in the coolant and effect an ample degree of cooling efficiency to be achieved by means of high coolant pressures and speeds. The invention also provides a mounting system for the damper which can stand up to high heat stresses.

Accordingly, an object of the present invention is to provide a damper construction which comprises a central hollow tubular pipe pivot portion which has an interior pipe coolant flow passage therethrough and a substantially flat plate portion connected to the pipe pivot portion and which includes a plurality of substantially concentrically arranged first arcuate bent tubes of different bend diameters having respective ends connected into one side of said tubular pipe pivot portion and having interiors defining tube coolant flow passages connected into the pipe coolant flow passage and which further includes a plurality of substantially concentrically arranged second arcuate bent tubes which are similarly connected to the opposite side of the pipe pivot portion and which include baffle means associated therewith such that flow is controlled through the pipe coolant flow passage and the tube coolant flow passages in a manner to provide cooling of these elements in accordance with the temperatures to which they are subjected.

Another object of the invention is to provide a method of effecting the cooling of a damper which is madeup of a plurality of concentrically arranged tubes, connecting into a central pivot tube, and which comprises, directing a coolant through one end of the central pivot tube and permitting it to flow through each of the concentrically arranged bent tubes so as to cool the bent tube which is subjected to the greatest temperatures with the most coolant and to provide a downwardly graduated flow through the remaining tubes in accordance with their temperature exposure.

A further object of the invention is to provide a damper construction and mounting therefor which includes a conduit in which the damper is mounted having a rotatable support bearing for supporting a pipe pivot portion of a damper and which includes means for directing a coolant medium around the bearing for supporting the pipe pivot and for circulating this fluid through the pipe pivot and through a plurality of tubular members forming a damper plate portion.

A still further object of the invention is to provide a damper construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 1 is a transverse sectional view of a hot gas conduit having a damper therein, constructed in accordance with the present invention; and FIG. 2 is a partial end elevational view of the conduit and damper shown in FIG. 1.

DESCRIPTION OF THE PREFERRED EMBODIMENT

Referring to the drawings in particular, the invention embodied therein, comprises, a damper construction for use in a conduit or gas pipe, generally designated 4, which is madeup of a plurality of tubes 19 which extend longitudinally and are arranged in abutting side-by-side relationship in a circular circumferential orientation. Pipes 19 are interconnected by welding therebetween, and they also have a fluid communication which communicates with the interior of bearing means in the form of axially spaced hollow bearings 50 and 50' which rotatably support an axial pipe or tubular pipe pivot portion 8 of a damper, which also includes a flat plate portion which is connected thereto.

In accordance with the invention, the flat plate portion, generally designated 2, comprises, a plurality of substantially concentrically arranged first arcuate bent tubes 18 of different bend diameters having respective ends connected into one side of the tubular pipe pivot portion 8 and having interiors defining tube coolant flow passages connected into the pipe coolant flow passages of the pipe pivot portion 8. Damper 2 also includes a plurality of substantially concentrically arranged second arcuate bent tubes of different bend diameters having respective ends connected into the opposite side of the tubular pipe pivot portion 8.

In accordance with a feature of the invention, baffle means are associated both with the first tubes 18 and the second tubes 20 and the tubular pipe pivot portion 8 to provide for the flow of a coolant medium through the axial pipe 8 and around through the tube coolant flow passages before traversing the whole length of the pipe 8 to the opposite end of the pipe and then for continuous flow through the outlet at the opposite end.

FIG. 1 shows the regulating damper 2, according to the invention, builtin to a cooled hot gas pipe or pipe system 4, and pivotably mounted on the latter by means of mountings or bearings 6. The hot gas pipe 4 is madeup of a plurality of pipes 19 arranged longitudinally so as to form a cylinder in a pipe-to-pipe construction, such as described in German Patent Appln. No. P 27 349 22.0. In order to cool the waste gas pipes 19, a coolant, such as water, is circulated in the pipes 19 forming the wall of the piping system 4. The damper 2 comprises the axial pipe 8, which may advantageously be madeup of a number of separate axial sections 10, 12, 14 and 16 arranged end-to-end and welded together. A plurality of semicircularly curved cooling pipes $18_l$ to $18_n$ and $20_l$ to $20_n$ are connected to pipe 8. The number n of the cooling pipes 18 and 20 depends on their cross-section and also on the internal diameter of the gas pipe 4. The cooling pipes 18 and 20 are nested one within the other and are combined in a pipe-to-pipe construction and jointed at their respective ends to pipe 8, thus forming a flat and primarily circular sealing device within the gas pipe 4. Since the proposed damper, in the applications in question, is not required to provide a hermetic sealing for the gas pipe 4, but merely provides a means of approximately regulating the flow of gas within it, a more or less wide gap 22 can be left between the closed damper 2 and the gas pipe 4.

The substantially semicircularly curved pipes 18 and 20 are immediately adjacent to the continuous axial pipe 8 and are flattened at their connection into apertures $24_l$ to $24_n$ and $26_l$ to $26_n$ provided in the axial pipe 8, so that they can be welded by the whole of their cross-section which is in contact with this axial pipe 8. The individual pipes 18 and 20 can advantageously also be welded to each other, as has been done in the case of the pipes 19 (See FIG. 1).

A central zone or area of the regulation damper 2 is cooled by means of two coolant chambers 28 and 30 which are delimited by part of the pipe walls $18_l$, $20_l$ and by sections 12 and 14, and by two pairs of covering plates 32, 34 and 36, 38 which are welded onto the respective sides, with 34 and 38 being situated in front of the plane of the drawing and thus not visible, due to the sectional diagram provided.

The joints 40, located in the zone in which the different cooling pipes 18 and 20 are connected to the axial pipe 8 can advantageously also be closed by means of cover plates welded thereon.

As shown in FIG. 1, the coolant for the regulating damper 2 enters through the axial pipe 8 at the end in the direction of arrow 44. The individual pipes or cooling chambers, as indicated by the arrows, are subjected to coolant flow via the different radial apertures 24, 26 and 42 in the axial pipe 8. The coolant returns to the axial pipe 8 from the pipes 18 and 20 or cooling chambers 30 and 32 via outlet apertures 24', 26' and 42' at their opposite ends and leaves the system at the opposite end of the pipe 8 in the direction of the arrow 46.

The great advantage of this system, in which the coolant is supplied to the pipes or chambers individually, resides in the fact that, by selecting a suitable cross-section or suitably calibrating the individual inlet apertures 24, 26 and 42 and/or outlet apertures 24', 26' and 42', each pipe can be supplied with an accurately proportioned part of the total quantity of coolant flowing through the system, in accordance with the different thermal stresses to which the individual zones of the damper are subjected.

Since, for example, the outer pipe $18_n$, $20_n$, is naturally exposed to heat in the current of hot gas the most, this pipe can be provided by suitably dimensioning the inlet aperture $24_n$, $26_n$, with a correspondingly ample portion of the quantity of coolant. In similar fashion, the thermal stress can be evenly distributed among all of the pipes, with the overall life of the damper thus being prolonged. At least equal importance is attached to the fact that, owing to the considerable pressure which the cooling pipes are capable of resisting, almost any degree of cooling efficiency desired can be obtained by increasing the pressure of the coolant, thus, again increasing the life of the damper or improving its heat-resisting properties.

In the hitherto used regulating dampers of the prior art, the mounting system of the dampers constituted a weak point, so that the acceptable thermal loading had to be limited to gas temperatures of about 800° C., and the invention, therefore, provides a considerable improvement in this respect. This improvement resides in the intensive cooling of the cooling damper mounting system, in consequence of which, as has been proven in tests, the thermal loadability increases to gas temperatures of about 1800° C. This highly efficient boring cooling system is by the method of guiding the coolant which is illustrated in FIGS. 1 and 2, and which constitutes an advantageous means of enabling the cooling system for the wall of the gas pipe to be utilized for the said purpose.

In order to achieve this object, the mounting system 6 of the axial pipe 8 is mainly constructed with the cooling chamber in the form of a hollow annular cylinder 50. The flow of coolant in the pipe wall 1, according to the patent application mentioned previously, takes opposite directions in every two adjacent cooling pipes 19 (See 19″, 19‴, and 19′, 19⁗, in FIG. 2.). With the invention, a current of coolant in every two adjacent cooling pipes 19 is guided into respective compartments 52 and 54 in the bodies 50 and 50″ of the mounting system (See FIG. 2) and ensures intensive cooling of the mounting system 6. The mounting system is thus no longer cooled merely from the inside by the flow of coolant in the axial pipe 8, but is also cooled from the outside, this taking place over an ample surface. This renders the considerable increase in the thermal loadability of the mounting system possible.

As may be clearly seen from the foregoing description, the proposed regulating damper with its cooled mounting system constitutes a considerable step forward in comparison with the prior art, since it has not only enabled the length of life of these elements to be considerably increased, but has also widened its potential sphere of application, since it provides a system which is capable of standing up to hitherto unacceptable heat stresses.

While a specific embodiment of the invention has been shown and described in detail to illustrate the application of the principles of the invention, it will be understood that the invention may be embodied otherwise without departing from such principles.

What is claimed is:

1. A damper construction for hot gas conduits comprising a central hollow tubular pipe pivot portion having an interior pipe coolant flow passage therethrough, and a substantially cylindrical flat plate portion connected to said pipe pivot portion, said flat plate portion including a plurality of substantially concentrically arranged first arcuate bent tubes of different bend diameters arranged side by side and abutting each other, having respective ends connected to one side of said tubular pipe pivot portion and having interiors defining tube coolant flow passages connected into said pipe coolant flow passage, a plurality of second substantially concentrically arranged arcuate bent tubes of different bend diameters arranged side by side and abutting each other, having respective ends connected to the opposite side of said tubular pipe pivot portion and having interiors defining tube coolant flow passages connected into said pipe coolant flow passage, baffle means associated with said first arcuate bent tubes, said second arcuate bent tubes and said pipe pivot portion providing a selected quantity of fluid flow through all of said tube coolant flow passages and said pipe coolant flow passage, said baffle means comprising orifices of selected sizes defining the connections between said first arcuate bent tubes and said second arcuate bent tubes in respect to said tubular pipe pivot portion, and bearing means pivotally supporting each end of said pipe pivot portions for rotation, said bearing means including a conduit surrounding said pipe pivot portion for the passage of a cooling medium therethrough.

2. A damper for hot gas conduits as claimed in claim 1, wherein said conduit surrounding said pipe pivot portion comprises two semicircular annular portions for receiving coolant in opposite directions.

3. A damper for hot gas conduits as claimed in claim 2, wherein a hot gas conduit carrying said damper comprises a plurality of axially extending and connected together pipes for receiving coolant flow in alternate opposite directions, one conduit portion of said bearing means connected to and dividing one of said axially extending pipes for receiving coolant flow in one direction and the other of said conduit portions connected to an adjacent axially extending pipe and dividing said axially extending pipe for receiving coolant flow in an opposite direction.

4. A damper for hot gas conduits, as claimed in claim 1, including a plate overlying each side of the damper between the innermost one of said bent tubes and said central pipe forming a space therein for coolant communicating with the coolant flow passage.

5. A damper for hot gas conduits as claimed in claim 1, wherein said central pipe comprises a plurality of separate pipe sections arranged end-to-end and welded together.

6. A damper for hot gas conduits, as claimed in claim 1, wherein said bent tubes have respective ends which are made flatter than the remaining portions thereof and are connected into said central pipe.

7. A method of cooling a damper which is made up of a central tubular pipe pivot portion and a plurality of concentric tubular portions connected to said pipe pivot portion from respective opposite sides, comprising, circulating a cooling medium through one end of said pipe pivot portion, deflecting the flow of the cooling medium so that a maximum amount of the cooling medium flows to the outermost one of said tubular pipe portions and a portion of a lesser amount flows through each successive tubular portion of lesser diameter, blocking most of the flow through said central tubular pivot portion so that the flow is around through the passages of the concentrically arranged tubular portions to the opposite end of the tubular pipe pivot portion and then permitting the outflow of the fluid through the opposite end of the tubular pipe pivot portion, arranging the damper in a conduit made up of a plurality of longitudinally extending pipes which are connected for the flow of a coolant therethrough, providing bearing means for supporting the pipe pivot portion which has a fluid flow passage therethrough, and directing cooling fluid through the bearing means.

* * * * *